United States Patent [19]
Hervin et al.

[11] Patent Number: 5,596,735
[45] Date of Patent: Jan. 21, 1997

[54] CIRCUIT AND METHOD FOR ADDRESSING SEGMENT DESCRIPTOR TABLES

[75] Inventors: Mark W. Hervin, Dallas, Tex.; Raul A. Garibay, Jr., Los Altos, Calif.

[73] Assignee: Cyrix Corporation, Richardson, Tex.

[21] Appl. No.: 606,150

[22] Filed: Feb. 23, 1996

[51] Int. Cl.⁶ .................. G06F 9/38; G06F 9/42
[52] U.S. Cl. .......... 395/586; 395/411; 395/412; 395/415; 395/800
[58] Field of Search ................... 395/375, 411, 395/412, 415, 700, 775, 800

[56] References Cited

U.S. PATENT DOCUMENTS

| | | | |
|---|---|---|---|
| 4,675,810 | 6/1987 | Gruer et al. | 395/412 |
| 4,825,358 | 4/1989 | Letwin | 395/700 |
| 5,027,273 | 6/1991 | Letwin | 395/411 |
| 5,136,717 | 8/1992 | Morley et al. | 395/800 |
| 5,148,538 | 9/1992 | Celtruda et al. | 395/415 |
| 5,255,379 | 10/1993 | Melo | 395/412 |
| 5,517,651 | 5/1996 | Huck et al. | 395/775 |

Primary Examiner—William M. Treat
Assistant Examiner—Saleh Najjar
Attorney, Agent, or Firm—Andrew S. Viger; John L. Maxin

[57] ABSTRACT

In a processor having a protected mode of operation in which a computer memory associated with the processor contains global and local descriptor tables addressed by a combination of a base address and an index, the processor having (i) global and local base address registers alternatively to provide the base address and (ii) a selector for containing the index and a table indicator (TI) bit indicating which of the global and local base address registers is to provide the base address, the processor requiring a time to derive the index and a value of the TI bit and a further time to combine the index and the base address, a base address register predicting circuit to predict, and a method of predicting, which of the global and local base address registers is to provide the base address without having to wait for the processor to derive the value of the TI bit. The circuit includes (i) TI bit predicting circuitry to generate a predicted value of the TI bit as a function of a prior value of the TI bit, and (ii) register access circuitry to access one of the global and local base address registers as a function of the predicted value of the TI bit.

26 Claims, 6 Drawing Sheets

CIRCUIT AND METHOD FOR ADDRESSING SEGMENT DESCRIPTOR TABLES

CROSS-REFERENCE TO RELATED APPLICATION

The present Application is related to U.S. patent application Ser. No. 08/138,789, filed Oct. 18, 1993, entitled "Microprocessor Pipe Control and Register Translation," commonly assigned with the present invention and incorporated herein by reference.

TECHNICAL FIELD OF THE INVENTION

The present invention is directed, in general, to computing systems and, more specifically, to a circuit and method addressing descriptor tables to assemble data pertaining to a particular segment of memory to be addressed.

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output ("I/O") devices. The system memory stores not only data, but also instructions that the processor is capable of retrieving and executing to cause the computer to perform one or more desired processes or functions. The I/O devices are operative to interact with a user through a graphical user interface ("GUI") (such as provided by Microsoft WINDOWS™ or IBM OS/2™), a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, processor clock rate may not increase beyond a threshold physical speed at which signals may traverse the processor. Simply stated, there is a practical maximum to the clock rate that is acceptable to conventional processors.

An alternate approach to improve computer performance is to increase the number of instructions executed per clock cycle by the processor ("processor throughput"). One technique for increasing processor throughput is pipelining, that calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline, the processing of one instruction completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

Memory management is one broad operation type that typically expends vast processor resources. More particularly, memory management refers to any one of a number of methods for storing and tracking data and programs in memory, as well as reclaiming previously occupied memory spaces that are no longer needed. The efficiency of a given memory management process and, in particular, the efficiency of a processor in performing the same, is measured largely by processor utilization.

Of particular concern to the present invention is segmentation. "Segmentation" is a memory management process that divides memory into sections commonly referred to as "segments." x86-based processors support a number of different processing modes, among which are real and protected modes. Real mode is an operational state, available first in the 80286 processor and its successors, that enables the processor to function as an 8086/8088 processor. Real mode addressing is limited to one megabyte of memory. Protected mode, by comparison, is an operational state, available first in the 80286 processor and its successors, that allows the processor to address all available memory. Protected mode is directed to preventing errant programs from entering each other's memory, such as that of the operating system. Segmentation is available in both the real and protected modes. In the 80386 processor and its successors, protected mode also began to provide access to 32-bit instructions and sophisticated memory management modes, including paging.

In conventional x86-based protected mode, memory objects (i.e., collections of fields, records or the like of addressable information in memory) and descriptor tables (i.e., tables of eight-byte data blocks that describe various attributes of the segments) are stored within one or more of a plurality of segments. A two-step process is required to gain access to a particular memory object. First, the processor combines the base address of a particular descriptor table and a selector (i.e., an offset or index) to access a particular descriptor therein. Then, in a second, separate operation, the processor uses the accessed descriptor to construct a base address of a particular segment associated with the particular memory object, combining the same with an offset into the segment to access the particular memory object.

The above-described segmentation process, while advantageously increasing the size of addressable memory, can be very time-inefficient (e.g., requiring multiple memory accesses, multiple instructions to facilitate each memory access and processor downtime awaiting completion of the memory accesses). Advantageously, a conventional descriptor cache may be employed to store descriptors that have been retrieved from memory. However, the process of retrieving descriptors from memory introduces latencies that may decrease the performance of the processor.

There accordingly exists a need in the art for systems and methods for improving memory management in x86-based processors and, more particularly, for reducing the inefficiencies associated with accessing segmented memory in x86-based protected mode.

SUMMARY OF THE INVENTION

To address the above-discussed deficiencies of the prior art, it is an object of the present invention to provide a system and method for reducing the inefficiencies associated with accessing segmented memory in protected mode.

In the attainment of the above-identified object, the present invention provides, in a processor having a protected mode of operation in which a computer memory associated with the processor contains global and local descriptor tables addressed by a combination of a base address and an index, the processor having (i) global and local base address registers alternatively to provide the base address and (ii) a selector for containing the index and a table indicator (TI) bit indicating which of the global and local base address registers is to provide the base address, the processor requiring a time to derive the index and a value of the TI bit and a further time to combine the index and the base address, a base address register predicting circuit to predict, and a method of predicting, which of the global and local base address registers is to provide the base address without having to wait for the processor to derive the value of the TI bit.

The circuit includes (i) TI bit predicting circuitry to generate a predicted value of the TI bit as a function of a prior value of the TI bit, and (ii) register access circuitry to access one of the global and local base address registers as a function of the predicted value of the TI bit. In an advantageous embodiment, the above-described functionality may suitably be undertaken and completed within a single clock cycle of the processor.

In a related embodiment of the present invention, the circuit further comprises comparison circuitry to compare a derived value of the TI bit and the predicted value of the TI bit, the register access circuitry accessing another of the global and local base address registers if the derived value of the TI bit is unequal to the predicted value of the TI bit. In an advantageous embodiment, if the value of the TI bit is mispredicted, descriptor table access may suitably be stalled for a single processor clock cycle. In further related embodiment of the present invention, the comparison circuitry is operative, if the TI bit is mispredicted, to invert the predicted value of the TI bit. Thus, while the present invention reduces the latencies and inefficiencies associated with segmented memory accesses, suitable means are provided by which any penalty associated with mispredicted values of TI are minimized. In a related embodiment of the present invention, the circuit further comprises descriptor table addressing circuitry, associated with the register access circuitry, to retrieve a segment descriptor from one of the global and local descriptor tables as a function of the base address and index.

In another embodiment of the present invention, the circuit includes computer memory addressing circuitry to address the computer memory as a function of one of the predicted value of the TI bit or the inverted predicted value of the TI bit. In an advantageous embodiment, special purpose circuitry is provided to accomplish the foregoing.

Those of ordinary skill in the art will recognize that the principles of the present invention may suitably be implemented or embodied in a sequence of instructions, such as microcode, hard-wired logic or a suitably-arranged combination of the same.

The foregoing has outlined rather broadly the features and technical advantages of the present invention so that those of ordinary skill in the art may better understand the detailed description of the invention that follows. Additional features and advantages of the invention will be described hereinafter that form the subject of the claims of the invention. Those of ordinary skill in the art should appreciate that they may readily use the conception and the specific embodiment disclosed as a basis for modifying or designing other structures for carrying out the same purposes of the present invention. Those of ordinary skill in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which.

DETAILED DESCRIPTION

Figure 1A:
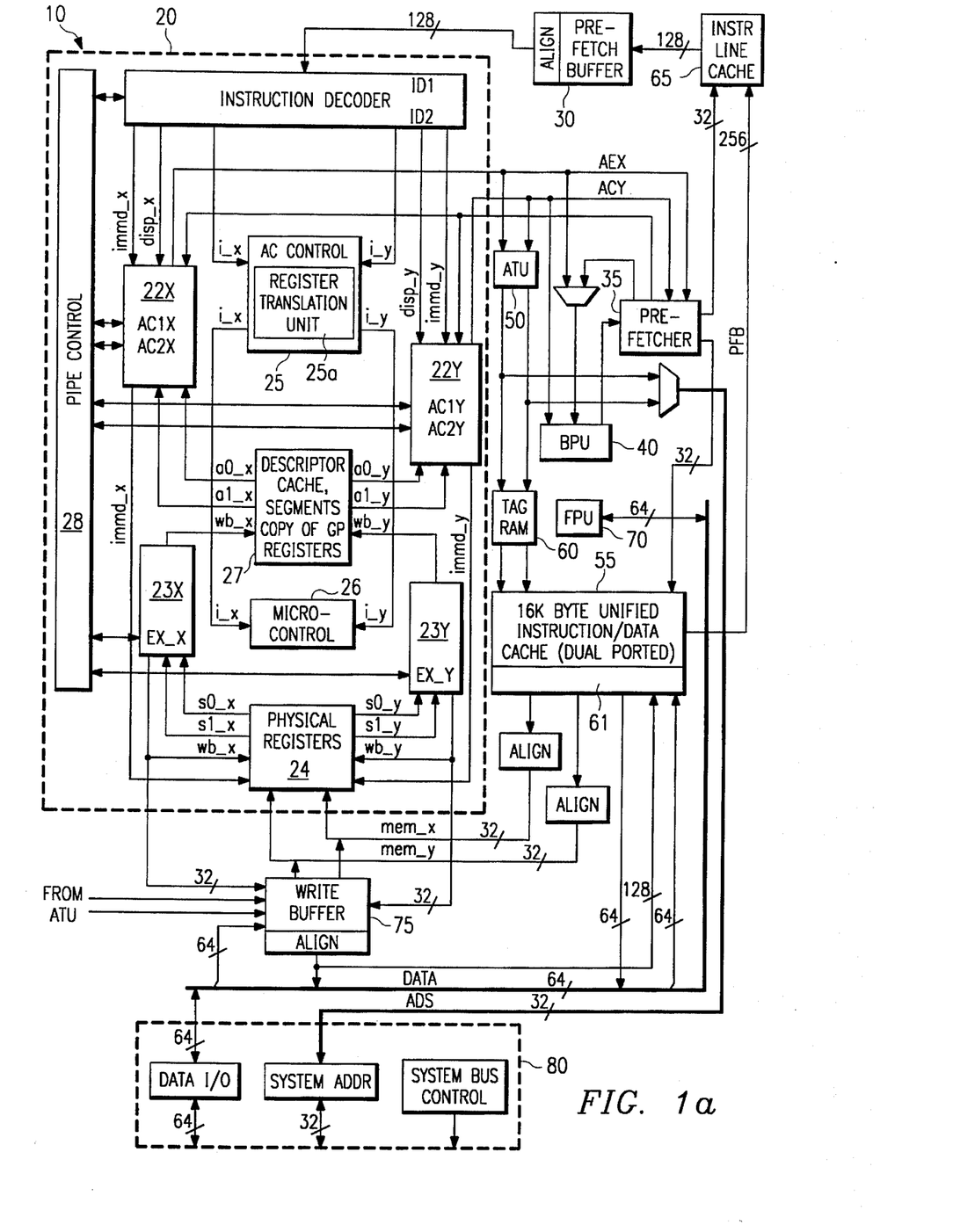
FIG. 1a illustrates a block diagram of an exemplary superscalar and superpipelined processor in accordance with the principles of the present invention.

Referring initially to FIG. 1a, illustrated is a block diagram of an exemplary superscalar and superpipelined processor 10 in accordance with the principles of the present invention. Exemplary processor 10 includes a processor core 20, a prefetch buffer 30, a prefetcher 35, a branch processing unit ("BPU") 40, an address translation unit ("ATU") 50, a unified cache 55, TAG random access memory ("TAG RAM") 60, an instruction line cache 65, an onboard floating point unit ("FPU") 70, a plurality of write buffers 75, and a bus interface unit ("BIU") 80. Each of the above-identified components is conventional, i.e., their functionality is known. The functionality associated with the interrelationship of various ones of the components is also known. Exemplary processors implementing the foregoing are available from Cyrix Corp. of Richardson, Tex. Cyrix Corp. manufactures the M1, M5, M6 and M7 processors.

In an exemplary embodiment, instruction line cache 65 and unified cache 55 respectively operate as primary and secondary instruction caches, each having a 32 byte line size. This implementation suitably reduces instruction fetches to unified cache 55. In a preferred embodiment, instruction line cache 65 may suitably be a 256 byte cache, while unified cache 55 may suitably be a 16 kilobyte ("Kbyte") code/data cache. Unified cache 55 may also suitably be associated with TAG RAM 60. "Associated with," as the term is used herein, means to include within, interconnect with, contain, be contained within, connect to, couple with, be communicable with, juxtapose, cooperate with, interleave or the like. In another exemplary embodiment, processor 10 may suitably use a 32-bit address bus ("ADB"), a 64-bit data bus ("DBS") and a 256 bit pre-fetch bus ("PFB"). The PFB corresponds to the 32 byte line sizes of unified cache 55 and instruction line cache 65, and suitably enables a full line of 32 instruction bytes to be transferred to instruction line cache 65 in a single clock cycle.

Unified cache 55 is preferably 4-way set associative, using a pseudo-least-recently-used ("LRU") replacement algorithm, with selectively alternative write-through and write-back modes. Unified cache 55 is multi-ported (through banking) to permit two memory accesses (e.g., data reads, instruction fetches or data writes) per clock cycle. Instruction line cache 65 is preferably a fully associative, look-aside implementation (relative to the unified cache 55), using an LRU replacement algorithm.

Turning momentarily to exemplary processor core 20, illustrated is a superscalar and superpipelined design having two exemplary execution pipelines, designated X and Y, and including an instruction decode ("ID") stage 21, two address calculation ("AC") stages, 22X and 22Y, two execution ("EX") stages, 23X and 23Y, and a register file 24 having 31 32-bit registers. Core 20 further includes an AC control stage 25, a microcontrol unit 26, a second register file 27 containing a descriptor cache, segment registers and a copy of the logical general purpose registers, and a pipe control unit 28.

Exemplary ID stage 21 is operative to decode a variable length x86-based instruction set, and may suitably retrieve 16 bytes of instruction data from pre-fetch buffer 30 each clock cycle. Exemplary AC stages 22X and 22Y are each operative to perform address calculations for their respective execution pipelines. Exemplary EX stages 23X and 23Y are each operative to execute instructions within their respective execution pipelines. Exemplary register file 24 suitably includes 31 physical registers. Exemplary AC control stage 25, that includes a register translation unit 25a, and may further suitably include appropriately arranged register renaming hardware (not shown), is operative to control address calculations. Exemplary microcontrol unit 26, that may suitably include a micro-sequencer (not shown) and a micro-ROM (not shown), provides execution control. Again, exemplary second register file 27 may suitably include a descriptor cache, segment registers and a copy of the logical general purpose registers (i.e., as obtained from register file 24). Exemplary pipe control unit 28 is operative to control instruction flow through exemplary execution pipelines X and Y, whereby instruction order is maintained until pipe control unit 28 determines that a particular instruction will not cause an exception.

In an exemplary embodiment, register translation unit 25a has a capacity to map 32 physical registers to 8 logical registers. In the illustrated embodiment however, processor 10 includes only 31 physical registers, leaving register translation unit 25a with excess mapping capacity. Processor 10 may suitably use the excess mapping capacity by allowing register translation unit 25a to map to a physical register located other than register file 24. In the illustrated embodiment, the physical register may suitably be located in second register file 27, that is under control of AC control unit 25. In an alternate exemplary embodiment, pipe control unit 28 is further operative to remove bubbles from the instruction stream, i.e., "flushing", the execution pipelines behind branches that are mis-predicted and handling the execution of exception-causing instructions.

More particularly, BPU 40 suitably monitors speculative execution associated with branches or floating point instructions (i.e., execution of instructions speculatively issued after branches that may be mis-predicted or floating point instructions issued to FPU 70 that may fault after execution of speculatively-issued instructions). In the event that a branch is mis-predicted (a condition not known until the instruction reaches one of the execution or write-back stages for the branch) or a floating point instruction faults, the execution pipeline is repaired to the point of the mis-predicted or faulting instruction (i.e., the execution pipeline is "flushed" behind the instruction) and an associated instruction fetch is restarted. Pipeline repair is preferably accomplished by creating processor state checkpoints at each pipeline stage as a predicted branch or floating point instruction enters the same. For these check pointed instructions, all processor resources (e.g., programmer-visible registers, the instruction pointer and the condition code register) that may suitably be modified by succeeding speculatively-issued instructions are check pointed. If a check pointed branch is mis-predicted or a check pointed floating point instruction faults, the execution pipeline is flushed behind the check pointed instruction. In the case of floating point instructions, this typically results in the entire execution pipeline being flushed. However, for a mis-predicted branch, there may be a paired instruction in EX and two instructions in WB that are nonetheless allowed to complete.

In accordance with the illustrated embodiment, writes from processor core 20 may suitably be queued into write buffer 75. Write buffers 75 provide an interface for writes to unified cache 55, while non-cacheable writes proceed directly from write buffers 75 to an external memory (shown and described in conjunction with FIG. 2). Write buffer logic may suitably support optional read sourcing and write gathering. In an exemplary embodiment, write buffer 75 includes twelve 32-bit write buffers, and write buffer allocation is performed by AC control unit 25.

FPU 70 includes a load/store stage with 4-deep load and store queues, a conversion stage (32-bit to 80-bit extended format), and an execution stage. Loads are controlled by processor core 20, and cacheable stores are directed through write buffers 75 (i.e., write buffer 75 is preferably allocated for each floating point store operation).

Figures 1B, 3:
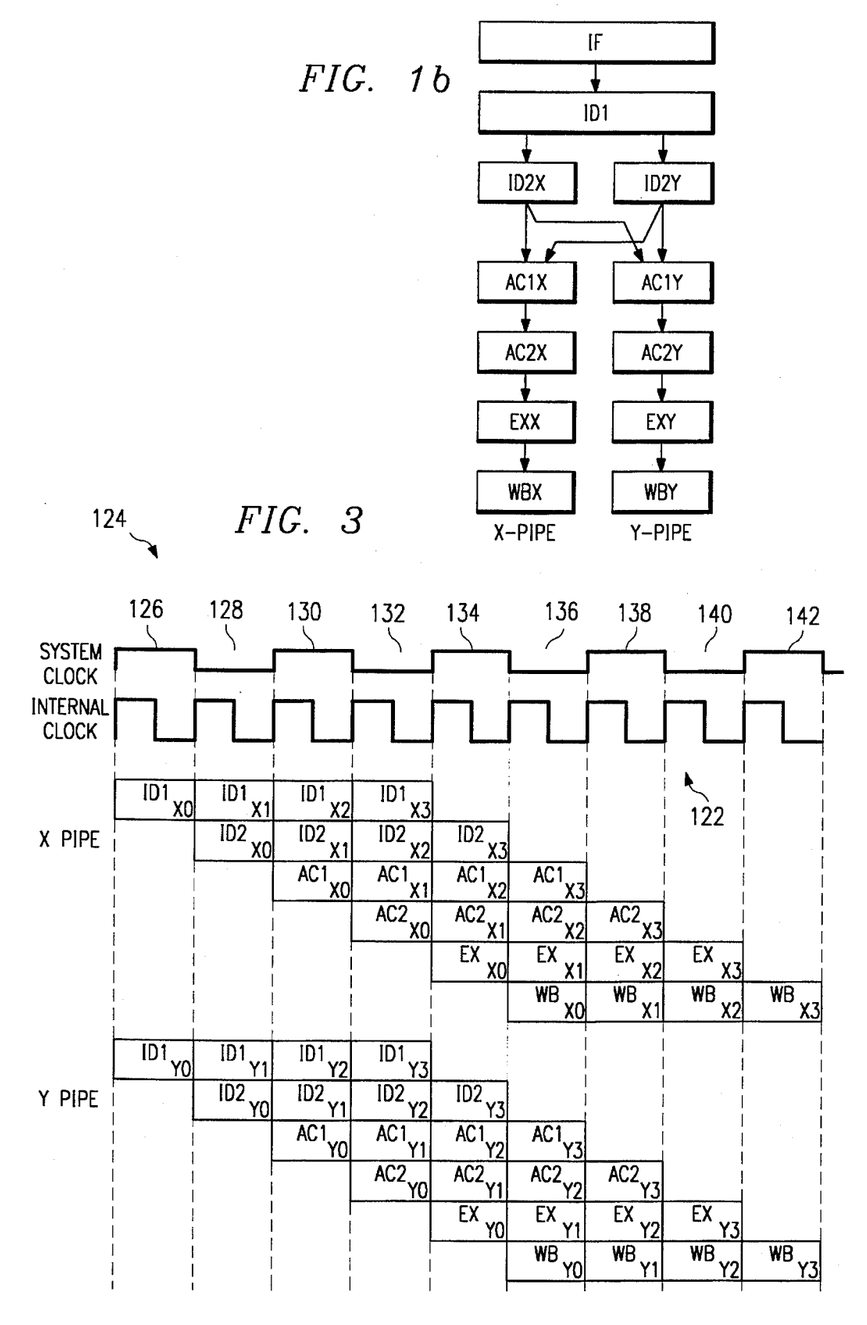
FIG. 1b illustrates a block diagram of an exemplary seven pipelined stage processor, including X and Y execution pipelines.
FIG. 3 illustrates an exemplary timing diagram demonstrating the flow of instructions through a pipeline unit in accordance with the exemplary processor of FIGS. 1 through 2.

Turning to FIG. 1b, illustrated is a more detailed block diagram of seven exemplary pipelined stages of processor 10 of FIG. 1a, including X and Y execution pipelines. As before, each of the X and Y execution pipelines includes IF, ID1, ID2, AC1, AC2, EX and WB stages. The discussion of FIG. 1b is undertaken with reference to FIG. 1b.

Exemplary IF stage provides a continuous instruction code stream into processor core 20. Prefetcher 35 is operative to fetch 16 bytes of instruction data into prefetch buffer 30 from either instruction line cache 65 or unified cache 55. BPU 40 is accessed with the prefetch address, and supplies target addresses to prefetcher 35 for predicted changes of flow, allowing prefetcher 35 to shift to a new code stream in a single clock cycle.

Exemplary decode stages ID1 and ID2 decode a variable length x86-based instruction set. Instruction decoder 21 retrieves 16 bytes of instruction data from prefetch buffer 30 each clock cycle. In ID1, the length of two instructions is decoded (one each for the X and Y execution pipelines) to obtain X and Y instruction pointers, a corresponding X and Y bytes-used signal is returned to prefetch buffer 30 that subsequently increments for the next 16 byte transfer. Also in ID1, certain instruction types are determined, such as changes of flow, and immediate or displacement operands are separated. In ID2, the decoding of X and Y instructions is completed, generating entry points for "microROM" and decoding addressing modes and register fields.

The optimum pipeline, X or Y, for executing an instruction is suitably determined during the ID stages, causing the instruction to be issued into that pipeline. In an exemplary embodiment, circuitry is provided for pipeline switching that suitably enables instructions to be switched from ID2X to AC1Y and from ID2Y to AC1X, as certain instructions (e.g., change of flow, floating point, exclusive or other like instructions) may only be issued in one of the two pipelines.

"Exclusive instructions," as the phrase is used herein, include any instructions that may fault within the EX pipeline stage, as well as certain instruction types, such as protected mode segment loads, string, special register access (control, debug, test, etc.), Multiply/Divide, Input/Output, PUSHA/POPA (PUSH all/POP all), task switch and the like. Exclusive instructions may suitably use the resources of both execution pipelines, exclusive instructions are preferably issued alone from the ID stage.

Exemplary address calculation stages AC1 and AC2 calculate addresses for memory references and supply memory operands. During AC1 two 32 bit linear (three operand) addresses are preferably calculated per clock cycle. Data dependencies are checked and resolved using register translation unit 25a and the 31 physical registers in register file 24 are advantageously used to map eight general purpose, programmer-visible logical registers in accordance with x86-based architecture, namely: EAX, EBX, ECX, EDX, EDI, ESI, EBP and ESP. During AC2, register file 24 and unified cache 55 are accessed with the physical address. For cache hits, cache access time for multi-ported, unified cache 55 is the same as that of a register, effectively extending the register set. The physical address is either the linear address, or if address translation is enabled, a translated address generated by ATU 50.

The AC stage preferably includes eight logical, or architectural, registers, representing the x86-based register set. In a preferred embodiment, the logical register corresponding to the stack pointer ("ESP") contains the actual stack pointer (instead of simply a copy thereof) when control of the stack pointer is allocated to AC1. If an instruction requires one or more address calculations, AC1 is operative to wait until the required data of the logical registers are valid before accessing those registers. During AC2, operands are obtained by accessing register file 24, and unified cache 55, with the physical address. The physical address therefore is preferably either the linear address, or if address translation is enabled, a translated address generated by ATU 50.

Exemplary ATU 50 is operative to generate translated addresses, preferably using a suitable translation look-aside buffer ("TLB") or the like, from the linear address using information from page tables in memory and local work space control registers. Unified cache 55 is virtually indexed and physically tagged to permit, when address translation is enabled, set selection with the untranslated address (available at the end of AC1) and, for each set, tag comparison with the translated address from ATU 50 (available early in AC2). In the illustrated embodiment, segmentation or address translation violation checks are suitably performed in AC2.

Instructions within a given instruction code stream are preferably kept in order until it is determined that out-of-order execution of the same will not cause an exception. This determination may suitably be made during or before AC2, although floating point and certain exclusive instructions may suitably cause exceptions during execution. Instructions are passed from AC2 to EX (floating point instructions are passed to FPU 70). Instructions spend a variable number of clock cycles in EX as many of the same may execute out of order. Integer instructions may cause exceptions in EX, they are therefore designated as exclusive and issued alone into both execution pipelines, thereby ensuring that exceptions are handled in order.

Exemplary execution stages EX X and EX Y suitably perform the operations defined by a given instruction using one or more of adder, logic, shifter, etc. functional units. The EX X execution stage may also include multiplication and division hardware.

Exemplary write back stage ("WB") updates register file 24, condition codes, as well as other parts of an suitable associated processing system with the results of the previously executed instruction. Typically, register file 24 is written in phase 1 ("PH1") of WB and read in phase 2 ("PH2") of AC2.

Additional disclosure of write buffers 75, speculative execution and the microsequencer may be found in Ser. No. 08/138,654, entitled "Control of Data for Speculative Execution and Exception Handling in a Processor with Write Buffer;" Ser. No. 08/138,783, entitled "Branch Processing Unit;" Ser. No. 08/138,781, entitled "Speculative Execution in a Pipelined Processor" and Ser. No. 08/138,855, entitled "Microprocessor Having Single Clock Instruction Decode Architecture", all of which are assigned to the assignee of the present invention and incorporated herein by reference for all purposes.

Figure 2:
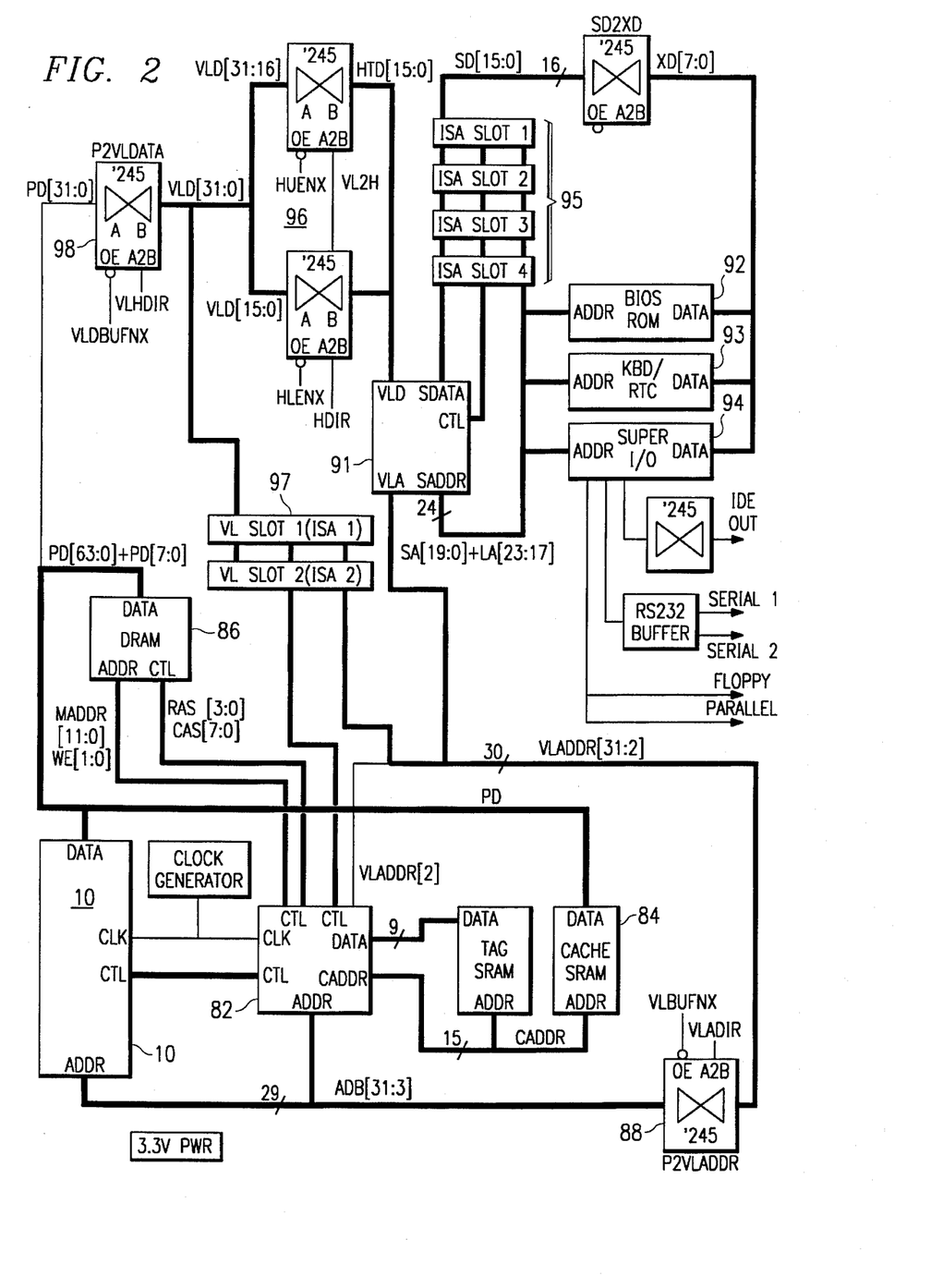
FIG. 2 illustrates a block diagram of an exemplary processor system.

Turning to FIG. 2, illustrated is an exemplary processor system design, in the form of a motherboard, that advantageously uses exemplary processor 10 of FIGS. 1a and 1b in cooperation with a single chip memory/bus controller 82. Controller 82 provides an interface between processor 10 and an external memory subsystem controlling data movement over DBS, the 64-bit processor data bus. The external memory subsystem includes level two cache 84 and main memory 86. In accordance with the illustrated embodiment, the data path may suitably be external to controller 82 thereby reducing its pin count and cost.

Controller 82 preferably interfaces with ADB, the 32-bit address bus, directly and includes a one bit wide data port (not shown) for reading and writing registers within controller 82. A bidirectional isolation buffer 88 is preferably provided as an address interface between processor 10 and a conventional video local bus ("VL-Bus") and a conventional industry standard architecture ("ISA") bus. Controller 82 provides control for VL-Bus and ISA bus interfaces. A VL/ISA interface chip 91 provides standard interfaces to an exemplary 32-bit VL-Bus and an exemplary 16-bit ISA bus. The ISA bus may suitable interface to a basic input/output system ("BIOS") 92, a keyboard controller 93, and an I/O chip 94, as well as standard ISA slots 95. The interface chip 91 preferably interfaces to the 32-bit VL-bus through a bidirectional 32/16 multiplexer 96 formed by multiple high/low word isolation buffers. The VL-Bus interfaces to standard VL-Bus slots 97, and through a bidirectional isolation buffer 98 to the low double word of PD.

Turning to FIG. 3, illustrated is an exemplary timing diagram demonstrating the flow of instructions through a pipeline in accordance with processor 10 of FIGS. 1a, 1b and 2. The timing diagram illustrates the flow of eight instructions through the pipeline, showing overlapping execution of instructions for a two pipeline architecture. Processor 10 preferably uses an internal clock 122 that is a multiple of a system clock 124. In the illustrated embodiment, internal clock 122 operates at twice the frequency of system clock 124.

During a first internal clock cycle 126, the ID1 stage operates respectively on instructions X0 and Y0. During internal clock cycle 128, instructions X0 and Y0 are in the ID2 stage (X0 being in ID2X and t13 being in ID2Y) and instructions X1 and Y1 are in the ID1 stage. During internal clock cycle 130, instructions X2 and Y2 are in the ID1 stage, instructions X1 and Y1 are in the ID2 stage (X1 being in ID2X and Y1 being in ID2Y) and instructions X0 and Y0 are in the AC1 stage (X0 being in AC1X and F0 being in AC1Y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage.

The execution portion of each of the foregoing instructions is performed during sequential clock cycles, namely, clock cycles 134 to 140. This is an important aspect a pipelined architecture as the total instructions completed per clock cycle increases without reducing the execution time of individual instructions. Greater instruction throughput is thereby achieved without requiring greater demands on the speed of the hardware.

It should be noted that FIG. 3 illustrates an optimum condition, as no stage requires more than a single clock cycle. In actuality, however, one or more stages may suitably require additional clock cycles for completion, thereby changing instruction flow through the other pipeline stages. Further, instruction flow through one pipeline may suitably depend upon the flow of other instructions in the same or the other pipeline.

Figure 4:
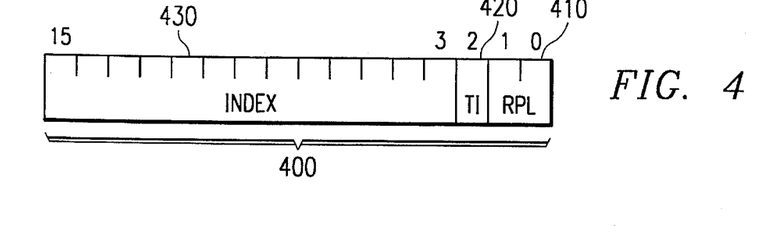
FIG. 4 illustrates an exemplary segment register employed for purposes of protected mode segment addressing in accordance with the exemplary processor of FIGS. 1 through 3.

Turning now to FIG. 4, illustrated is an exemplary selector ("SR") (generally designated 400) employed for purposes of protected mode segment addressing in accordance with processor 10 of FIGS. 1a, 1b, 2 and 3. In accordance with conventional x86-based real mode, the addressing unit of processor 10 simply multiplies the value of SR 400 by 16 to determine the base address of an associated segment in memory. In protected mode, by comparison, the value of SR 400 represents a "selector," as opposed to a base address.

In the illustrated embodiment, SR 400 is 16 bits in length. The two least significant bits indicate a requested privilege level ("RPL") 410 from which a program may access a segment. Use of RPL 410 provides an access check for protected mode. The third least significant bit is commonly referred to as the table indicator ("TI") bit 420. TI bit 420 indicates whether a global descriptor table ("GDT"), TI=0, or a local descriptor table ("LDT"), TI=1, is to be used to determine the location of a particular segment in memory. The remaining 13 bits are commonly referred to as an index 430, that is used by processor 10 to index into one of the GDT or LDT. Index 430 may suitably be used to select one of 8,192 ($2^{13}$) descriptors within one of the GDT or LDT. This is preferably accomplished by multiplying index 430 by eight (the number of bytes in an x86-based segment descriptor) and adding the result to the base address of the descriptor table (read from one of a global descriptor table register ("GDTR") or a local descriptor table register ("LDTR")).

"Segment descriptor," as the phrase is used herein, refers to a suitably-arranged data structure that provides processor 10 with the size and location of a particular segment, as well as control and status information. Segment descriptors are generally created by one of a compiler, a linker, a loader, an operating system or the like, but typically not an application program. In x86-based protected mode, each of the GDT and LDT is configured as an array of segment descriptors. One GDT is provided for all tasks. There may, or may not, be a separate LDT for each task being run. The GDT and each of the LDTs may suitably be variable in length and contain up to 8,192 descriptors.

Processor 10 locates either the GDT or one of the LDTs by respectively using one of the GDTR or the LDTR, each of which may suitably hold a 32-bit base address for, and a 16-bit limit value for the size of, its associated descriptor table. As with segments, the limit value is added to the base address to get the address of the last valid byte. A limit value of zero results in exactly one valid byte. The LGDT and SGDT instructions write and read the GDTR register, while the LLDT and SLDT instructions write and read the segment selector in the LDTR register.

In accordance with x86-based architecture, processor 10 preferably includes six segment registers (CS, DS, ES, FS, GS and SS), each of which may suitably include a segment selector that points to a segment descriptor. If a program currently executing in processor 10 is associated with more segments than the six whose segment selectors occupy the segment registers, then the program may use known forms of the "MOV" or "POP" instructions, for example, to change the contents of one or more of these segment registers when it needs to access a new segment.

Figure 5:
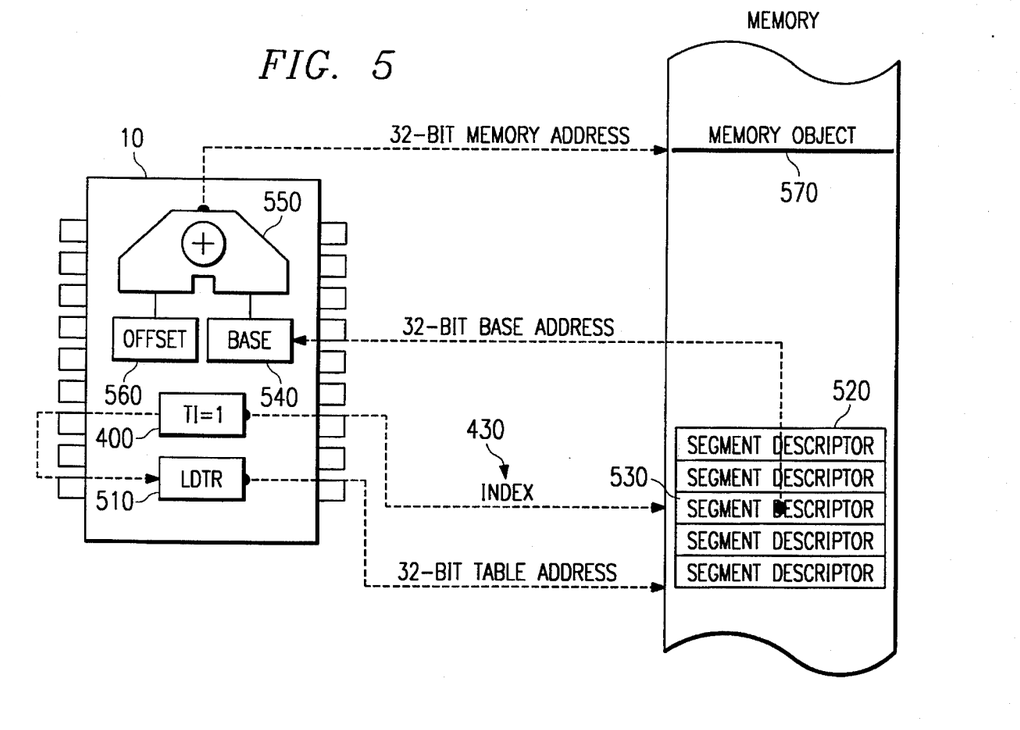
FIG. 5 illustrates a highly schematic diagram of the manner in which the exemplary processor of FIGS. 1 through 3 may employ the exemplary segment register of FIG. 4 for protected mode segment addressing.

Turning now to FIG. 5, illustrated is a highly schematic diagram of the manner in which processor 10 of FIGS. 1a, 1b, 2 and 3 may suitably employ SR 400 of FIG. 4 for protected mode segment addressing. As described above, the addressing of a particular memory object is a two-step process. First, a descriptor corresponding to a segment to be accessed must be retrieved from memory or a cache. Second, the descriptor must be used, in part, to construct a base address for the segment which, when combined with an offset, forms the address of the memory object.

In a preferred embodiment, processor 10 uses TI bit 420 in SR 400 to determine whether the GDT or a LDT is to be accessed. In the illustrated embodiment TI=1 indicating the LDT. Processor 10 uses LDTR 510 to determine the base address of LDT 520. Processor 10 suitably adds index 430 of SR 400 to the base address in LDTR 510 to thereby address LDT 520 and a segment descriptor 530 therein. Processor 10 employs segment descriptor 530, that is eight bytes long, to determine a base address 540 and a limit (not shown) of a particular segment in memory.

Processor 10, using conventional address adder circuitry 550, adds base address 540 and an associated offset 560 to generate the linear address of an object 570 within memory. Processor 10 may suitably be further operative to check that the generated address is within the limit of the segment (i.e., expand down segments reverse the meaning of the limit check), if it is not, processor 10 preferably issues a "general protection fault" exception. In alternate advantegious embodiments, processor 10 may suitably issue other exceptions, such as stack and invalid task state segment exceptions, for example.

Those of ordinary skill in the art know that although only a single descriptor table is illustrated, conventional implementations suitably include a plurality of descriptor tables. Further, although a single conventional memory is illustrated, conventional implementations may suitably include a plurality of associated conventional memory storage devices. Still further, the conventional memory can be main or system memory or an associated cache memory or registers. "Associated," as the term is used herein, may suitably be analogized with associated with.

Figure 6:
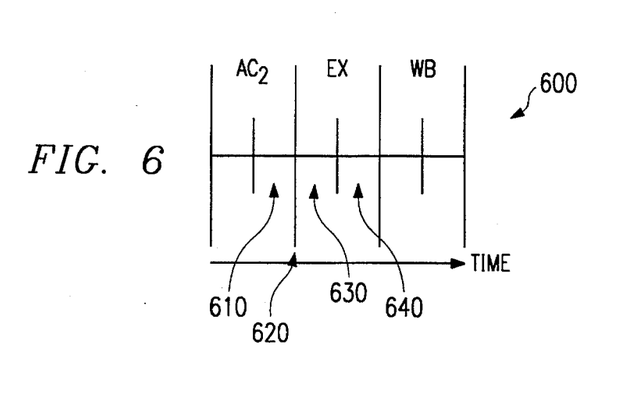
FIG. 6 illustrates a timing diagram representing an availability of portions of data to be loaded into the exemplary segment register of FIG. 4.
Figures 7, 8:
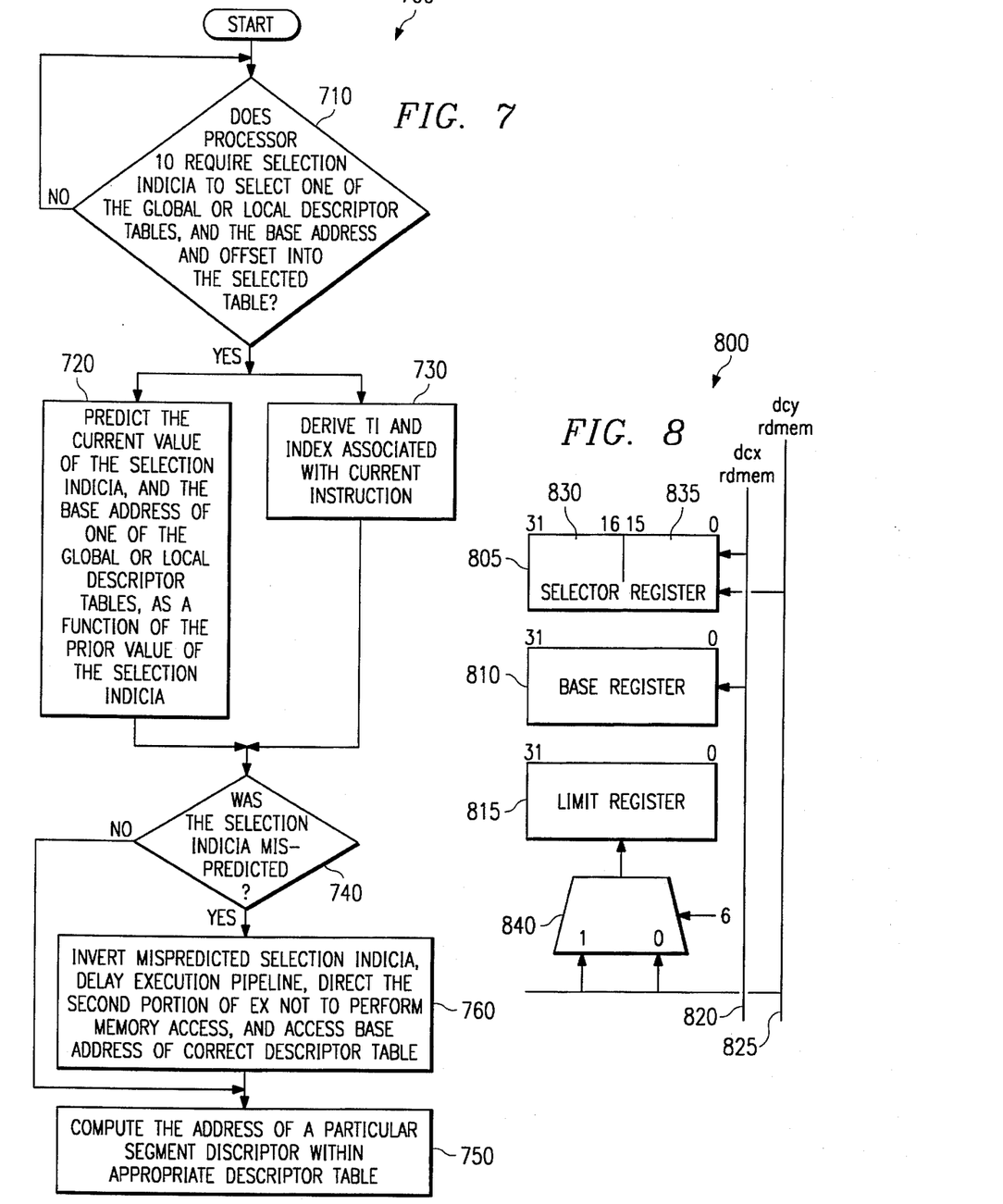
FIG. 7 illustrates a method of loading data into the exemplary segment register of FIG. 4 wherein a value of a table indicator ("TI") bit of the exemplary segment register is predicted to reduce the average time required in loading such data.
FIG. 8 illustrates a highly schematic diagram of special purpose circuitry for retrieving a segment descriptor as a function of one of a predicted value of a table index ("TI") bit or an inverted predicted value of the TI bit according to the present invention.

Turning now to FIGS. 6 and 7, respectively illustrated are a timing diagram (generally designated 600) and a flow diagram (generally designated 700). Exemplary timing diagram 600 represents an availability of data to be loaded into SR 400 of FIG. 4 and subsequent access of memory object 570 of FIG. 5, all during x86-based protected mode. Exemplary flow diagram 700 represents a method of predicting which of the GDTR or LDTR 510 is to provide a base address for accessing one of the GDT or LDT 520 without waiting for processor 10 to derive a value of TI bit 420.

For purposes of illustration, the discussion of FIGS. 6 and 7 is undertaken with reference to FIGS. 3, 4 and 5. It is assumed that a current task is executing in processor 10 in x86-based protected mode and, more particularly, that (i) a present instruction is executing in one of the X or Y pipelines of FIG. 3, and (ii) the portion of the current task that completed execution immediately before the execution of the present instruction required a segment load. The segment load included a value of TI bit 420 that directs processor 10 to access of LDTR 510 for the base address of LDT 520 of FIG. 5.

Processor 10, while executing the present instruction during the second portion of AC2 (generally designated 610), requires indicia (e.g., TI bit 420) to select one of the GDTR or LDTR 510 for the respective base address of one of the GDT or LDT 520 (YES branch of decisional step 710).

Conventionally, a derived value of TI bit 420 is not available until either immediately before the first portion of EX (generally designated 620) or, worse, during the first portion of EX (generally designated 630). According to conventional techniques, x86-based processors may suitably stall the pertinent pipeline for one or more clock cycles after TI bit 420 is available to select the base address of the desired one of the alternative descriptor tables.

In stark contrast, the present invention, in response to the latency period associated with determining which descriptor base address register to use, enables the processor 10 to predict a value for TI bit 420 as a function of the prior segment load (process block 720). Because the prior executed portion of the current task directed processor 10 to access LDT 520, it is probable, or likely, that the derived value of TI bit 420 will similarly direct processor 10 to access LDT 520. A predicted value of TI bit 420 is generated as a function of the prior value TI 20.

An important aspect of the present invention is that Processor 10 predicts which of the GDTR and LDTR 510 is to provide the base address without waiting for the derived value of TI bit 420.

Processor 10 concurrently employs the above-identified conventional approach to derive index 430, as well as TI bit 420 which may suitably be used to verify the above-described prediction (process block 730). The value of derived TI bit 420 and index 430 may suitably be driven out onto conventional operand buses for subsequent descriptor table access. Processor 10, by the completion of the second portion of AC2 (time 630), is suitably operable to combine derived index 430 with the predicted base address, LDTR 510, to access LDT 520 to retrieve segment descriptor 530.

Processor 10 suitably verifies the predicted value of TI bit 420 (decisional step 740). The derived value of TI bit 420 is preferably suitably compared with the predicted value of TI bit 420. If the predicted value of TI bit 420 was correctly predicted (YES branch of decisional step 740), processor 10 suitably combines derived index 430 with the base address of LDT 520 stored in LDTR 510 to compute the address associated with segment descriptor 530 (process block 750). If the predicted value of TI bit 420 is incorrectly predicted, or mispredicted, (NO branch of decisional step 740), processor 10 suitably inverts the predicted value of TI bit 420, stalls the pertinent execution pipeline, preferably for approximately one clock cycle, and suitably informs the second portion of EX (generally designated 640) that a memory request should not be issued based upon a combination of derived index 430 and the predicted LDTR 510 table address (process block 760).

Inversion of the mispredicted value of TI bit 420 indicates that the second instruction is associated with the GDT, directing processor 10 to access the GDTR for the base address of the GDT. Processor 10 is operative to combine derived index 430 with the base address of the GDT stored GDTR to compute the address associated with a segment descriptor of the GDT (process block 750). Those of ordinary skill in the art should understand that the principles set forth in the above-described embodiment may suitably predict continued use of the GDT, TI=0, for exemplary third, fourth, etc. instructions executing in processor 10, and vice versa.

Figure 9:
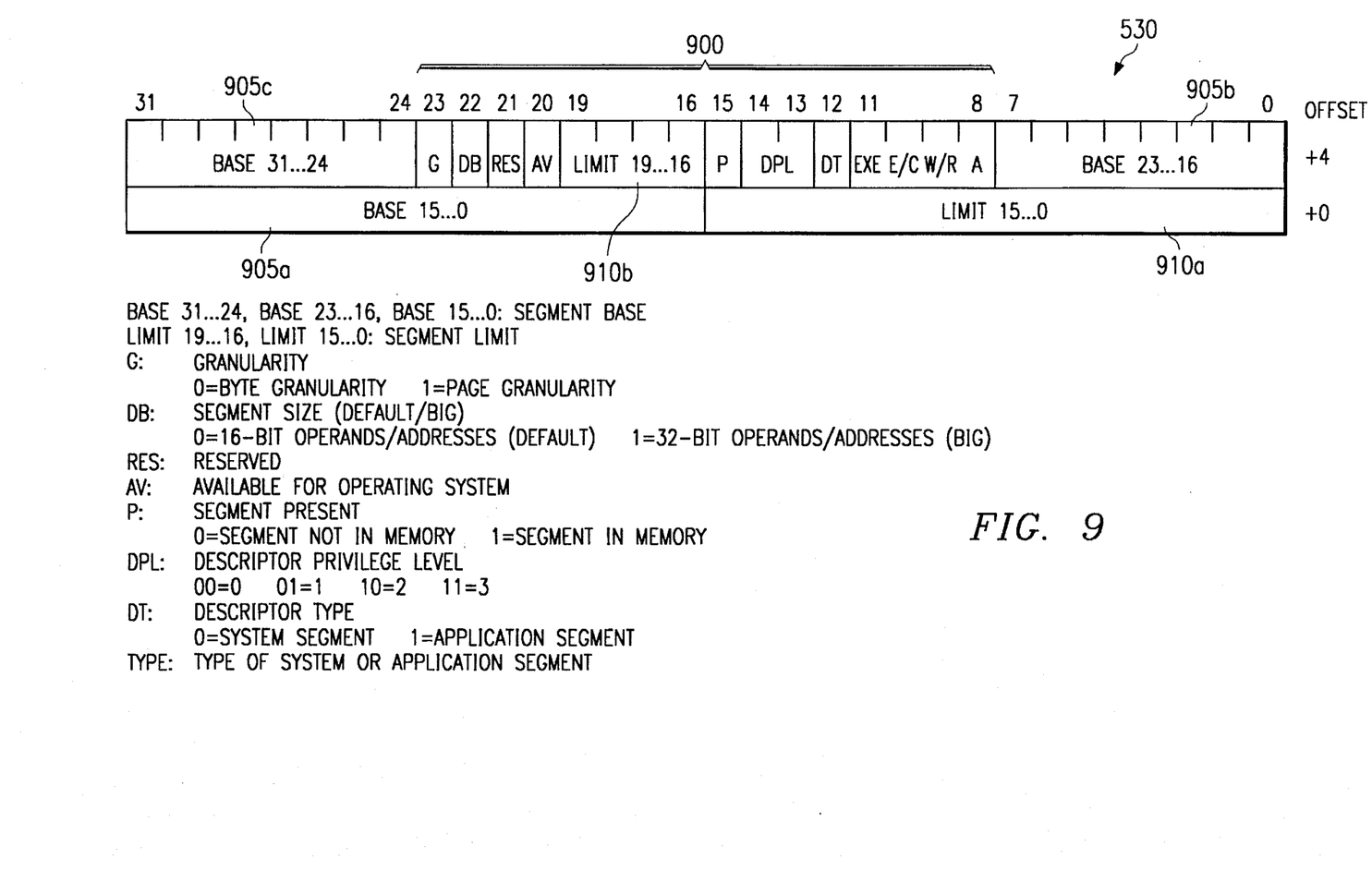
FIG. 9 illustrates a block diagram of an exemplary segment descriptor according to x86-based architectures.

FIG. 8 illustrates a highly schematic diagram of special purpose circuitry (generally designate 800) for retrieving a conventional x86-based segment descriptor (illustrated in FIG. 9) as a function of one of a predicted value or an inverted predicted value of TI bit 420 according to the present invention. Circuity 800 includes three conventional 32 bit registers 805, 810 and 815, each of which is suitably associated, directly or indirectly, with at least one of two conventional 32 bit data buses, namely, dcx rdmem 820 and dcy rdmem 825.

Exemplary register 805 is bisected into a first section 830 (31:16) and a second section 835 (15:0). According to the illustrated embodiment, bits 31:16 of register 805 suitably store bits 23:8 (generally designated 900) of descriptor 530 of FIGS. 5 and 9, and bits 15:0 of register 805 suitably store selector 400 of FIG. 4. Exemplary register 810 suitably stores a 32 bit base address 905a, 905b and 905c. Exemplary register 815 suitably stores a limit as a function of the conventional granularity bit, G, of FIG. 9. When G=0, byte granularity is active and "0x0000" and a 20 bit limit 910a and 910b are concatenated, and when G=1, page granularity is active and 20 bit limit 910a and 910b and "0xfff" are concatenated to form the base address.

From the above, it is apparent that the present invention provides, in a processor having a protected mode of operation in which a computer memory associated with the processor contains global and local descriptor tables addressed by a combination of a base address and an index, the processor having (i) global and local base address registers alternatively to provide the base address and (ii) a selector for containing the index and a table indicator (TI) bit indicating which of the global and local base address registers is to provide the base address, the processor requiring a time to derive the index and a value of the TI bit and a further time to combine the index and the base address, a base address register predicting circuit to predict, and a method of predicting, which of the global and local base address registers is to provide the base address without having to wait for the processor to derive the value of the TI bit.

The circuit includes (i) TI bit predicting circuitry to generate a predicted value of the TI bit as a function of a prior value of the TI bit, and (ii)register access circuitry to access one of the global and local base address registers as a function of the predicted value of the TI bit. In an advantageous embodiment, the above-described functionality may suitable be undertaken and completed within a single processor clock cycle.

Although the present invention and its advantages have been described in detail, those of ordinary skill in the art should understand that they can make various changes, substitutions and alterations herein without departing from the spirit and scope of the invention in its broadest form.

What is claimed is:

1. In a processor having a protected mode of operation in which a computer memory associated with said processor contains global and local descriptor tables addressed by a combination of a base address and an index, said processor having global and local base address registers alternatively to provide said base address, said processor further having a selector for containing said index and a table indicator (TI) bit indicating which of said global and local base address registers is to provide said base address, said processor requiring a time to derive said index and a value of said TI bit and a further time to combine said index and said base address, a base address register predicting circuit to predict which of said global and local base address registers is to provide said base address without having to wait for said processor to derive said value of said TI bit, comprising:

TI bit predicting circuitry to generate a predicted value of said TI bit as a function of a prior value of said TI bit; and register access circuitry to access one of said global and local base address registers as a function of said predicted value of said TI bit.

2. The circuit as recited in claim 1 further comprising comparison circuitry to compare a derived value of said TI bit and said predicted value of said TI bit, said register access circuitry accessing another of said global and local base address registers if said derived value of said TI bit is unequal to said predicted value of said TI bit.

3. The circuit as recited in claim 2 wherein said comparison circuitry is further operative to invert said predicted value of said TI bit.

4. The circuit as recited in claim 2 further including descriptor table addressing circuitry, associated with said register access circuitry, to retrieve a segment descriptor from one of said global and local descriptor tables as a function of said base address and said index.

5. The circuit as recited in claim 2 further comprising computer memory addressing circuitry to address said computer memory as a function of said inverted predicted value of said TI bit.

6. In a processor having a protected mode of operation in which a computer memory associated with said processor contains global and local descriptor tables addressed by a combination of a base address and an index, said processor having global and local base address registers alternatively to provide said base address, said processor further having a selector for containing said index and a table indicator (TI) bit indicating which of said global and local base address registers is to provide said base address, said processor requiring a time to derive said index and a value of said TI bit and a further time to combine said index and said base address, a base address register predicting circuit to predict which of said global and local base address registers is to provide said base address without having to wait for said processor to derive said value of said TI bit, comprising:

TI bit predicting means for generating a predicted value of said TI bit as a function of a prior value of said TI bit; and register access means for accessing one of said global and local base address registers as a function of said predicted value of said TI bit.

7. The circuit as recited in claim 6 further comprising comparison means for comparing a derived value of said TI bit and said predicted value of said TI bit, said register access circuitry means accessing another of said global and local base address registers if said derived value of said TI bit is unequal to said predicted value of said TI bit.

8. The circuit as recited in claim 7 wherein said comparison means is further operative to invert said predicted value of said TI bit.

9. The circuit as recited in claim 7 further including descriptor table addressing means, associated with said register access means, for retrieving a segment descriptor from one of said global and local descriptor tables as a function of said base address and said index.

10. The circuit as recited in claim 7 further comprising computer memory addressing means for addressing said computer memory as a function of said inverted predicted value of said TI bit.

11. In a processor having a protected mode of operation in which a computer memory associated with said processor contains global and local descriptor tables addressed by a combination of a base address and an index, said processor having global and local base address registers alternatively to provide said base address, said processor further having a selector for containing said index and a table indicator (TI)

bit indicating which of said global and local base address registers is to provide said base address, said processor requiring a time to derive said index and a value of said TI bit and a further time to combine said index and said base address, a method of predicting which of said global and local base address registers is to provide said base address without having to wait for said processor to derive said value of said TI bit, comprising the steps of:

generating a predicted value of said TI bit as a function of a prior value of said TI bit; and accessing one of said global and local base address registers as a function of said predicted value of said TI bit.

12. The method as recited in claim 11 further comprising the steps of:

comparing a derived value of said TI bit and said predicted value of said TI bit; and accessing another of said global and local base address registers if said derived value of said TI bit is unequal to said predicted value of said TI bit.

13. The method as recited in claim 12 further comprising the step of inverting said predicted value of said TI bit if said derived value of said TI bit is unequal to said predicted value of said TI bit.

14. The method as recited in claim 13 further comprising the step of addressing said computer memory as a function of said predicted value of said TI bit.

15. The method as recited in claim 12 further comprising the step of retrieving a segment descriptor from one of said global and local descriptor tables as a function of said base address and said index.

16. A computer system, comprising:

(a) a processor having a protected mode of operation in which a computer memory associated with said processor contains global and local descriptor tables addressed by a combination of a base address and an index, said processor having global and local base address registers alternatively to provide said base address, said processor further having a selector for containing said index and a table indicator (TI) bit indicating which of said global and local base address registers is to provide said base address, said processor requiring a time to derive said index and a value of said TI bit and a further time to combine said index and said base address;

(b) said computer memory further containing instructions including instructions affecting said selector;

(c) said processor including instruction fetch logic that fetches instructions from said computer memory; and (d) said processor further including a base address register predicting circuit to predict which of said global and local base address registers is to provide said base address without having to wait for said processor to derive said value of said TI bit, said base address register predicting circuit comprising:

(i) TI bit predicting circuitry to generate a predicted value of said TI bit as a function of a prior value of said TI bit; and (ii) register access circuitry to access one of said global and local base address registers as a function of said predicted value of said TI bit.

17. The computer system as recited in claim 16 further comprising comparison circuitry to compare a derived value of said TI bit and said predicted value of said TI bit, said register access circuitry accessing another of said global and local base address registers if said derived value of said TI bit is unequal to said predicted value of said TI bit.

18. The computer system as recited in claim 17 wherein said comparison circuitry is further operative to invert said predicted value of said TI bit.

19. The computer system as recited in claim 17 further including descriptor table addressing circuitry, associated with said register access circuitry, to retrieve a segment descriptor from one of said global and local descriptor tables as a function of said base address and said index.

20. The computer system as recited in claim 17 further comprising computer memory addressing circuitry to address said computer memory as a function of said inverted predicted value of said TI bit.

21. A method of operating a computer system, comprising the steps of:

(a) applying power to a processor having a protected mode of operation in which a computer memory associated with said processor contains global and local descriptor tables addressed by a combination of a base address and an index, said processor having global and local base address registers alternatively to provide said base address, said processor further having a selector for containing said index and a table indicator (TI) bit indicating which of said global and local base address registers is to provide said base address, said processor requiring a time to derive said index and a value of said TI bit and a further time to combine said index and said base address;

(b) storing instructions in said computer memory, said instructions including instructions affecting said selector;

(c) fetching instructions from said computer memory; and (d) executing instructions in said processor and predicting which of said global and local base address registers is to provide said base address without having to wait for said processor to derive said value of said TI bit.

22. The method recited in claim 21 wherein said predicting step further includes the steps of:

generating a predicted value of said TI bit as a function of a prior value of said TI bit; and accessing one of said global and local base address registers as a function of said predicted value of said TI bit.

23. The method as recited in claim 21 further comprising the steps of:

comparing a derived value of said TI bit and said predicted value of said TI bit; and accessing another of said global and local base address registers if said derived value of said TI bit is unequal to said predicted value of said TI bit.

24. The method as recited in claim 23 wherein said comparing step includes the step of inverting said predicted value of said TI bit.

25. The method as recited in claim 24 further comprising the step of addressing said computer memory as a function of said inverted predicted value of said TI bit.

26. The method as recited in claim 22 further including the step of retrieving a segment descriptor from one of said global and local descriptor tables as a function of said base address and said index.

\* \* \* \* \*